March 28, 1944. W. DE BACK 2,344,975
CAN CONVEYING AND TRANSFER APPARATUS
Original Filed July 15, 1940  3 Sheets-Sheet 1
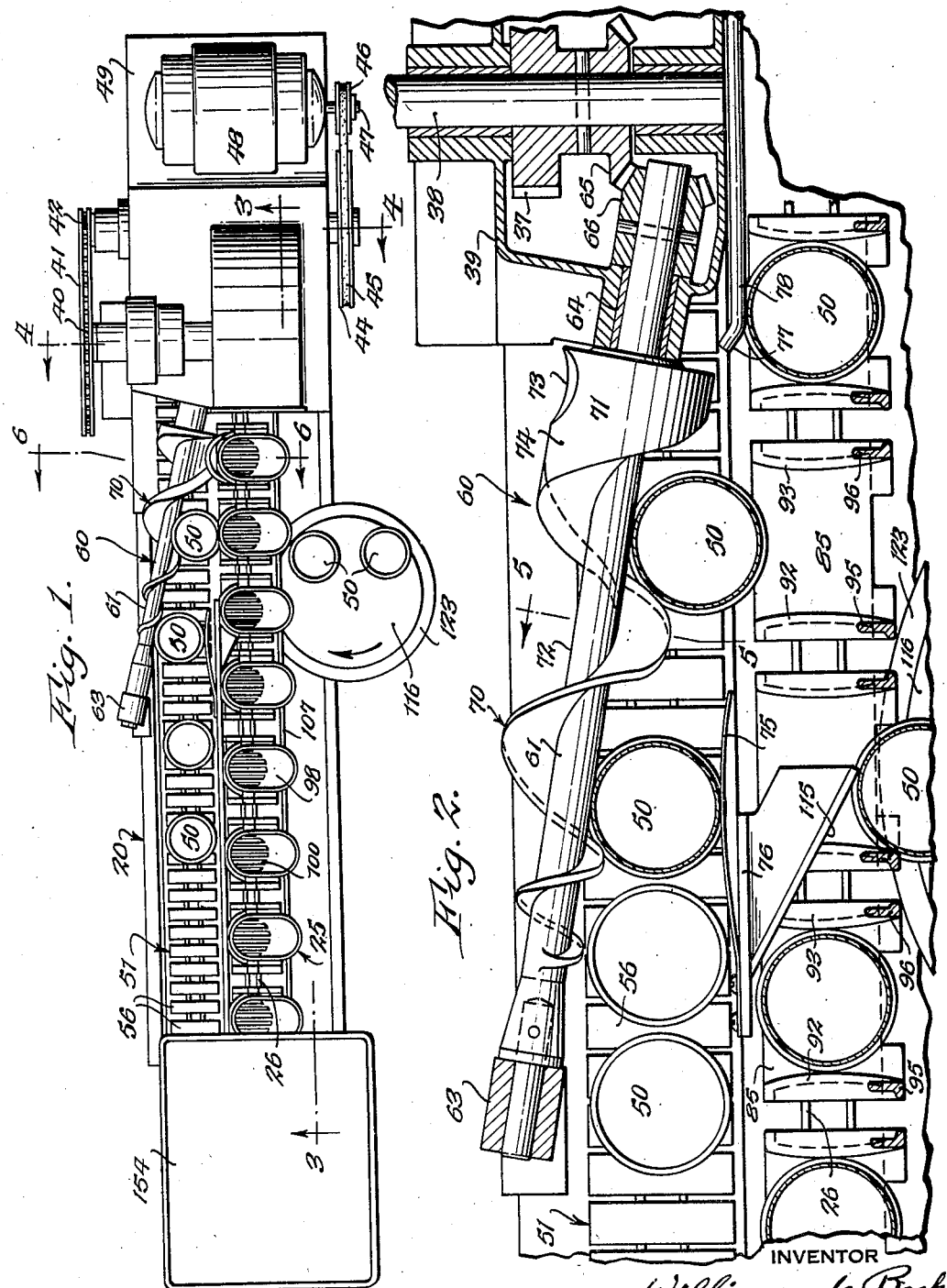
INVENTOR
William de Back
BY
Popp and Popp
ATTORNEYS

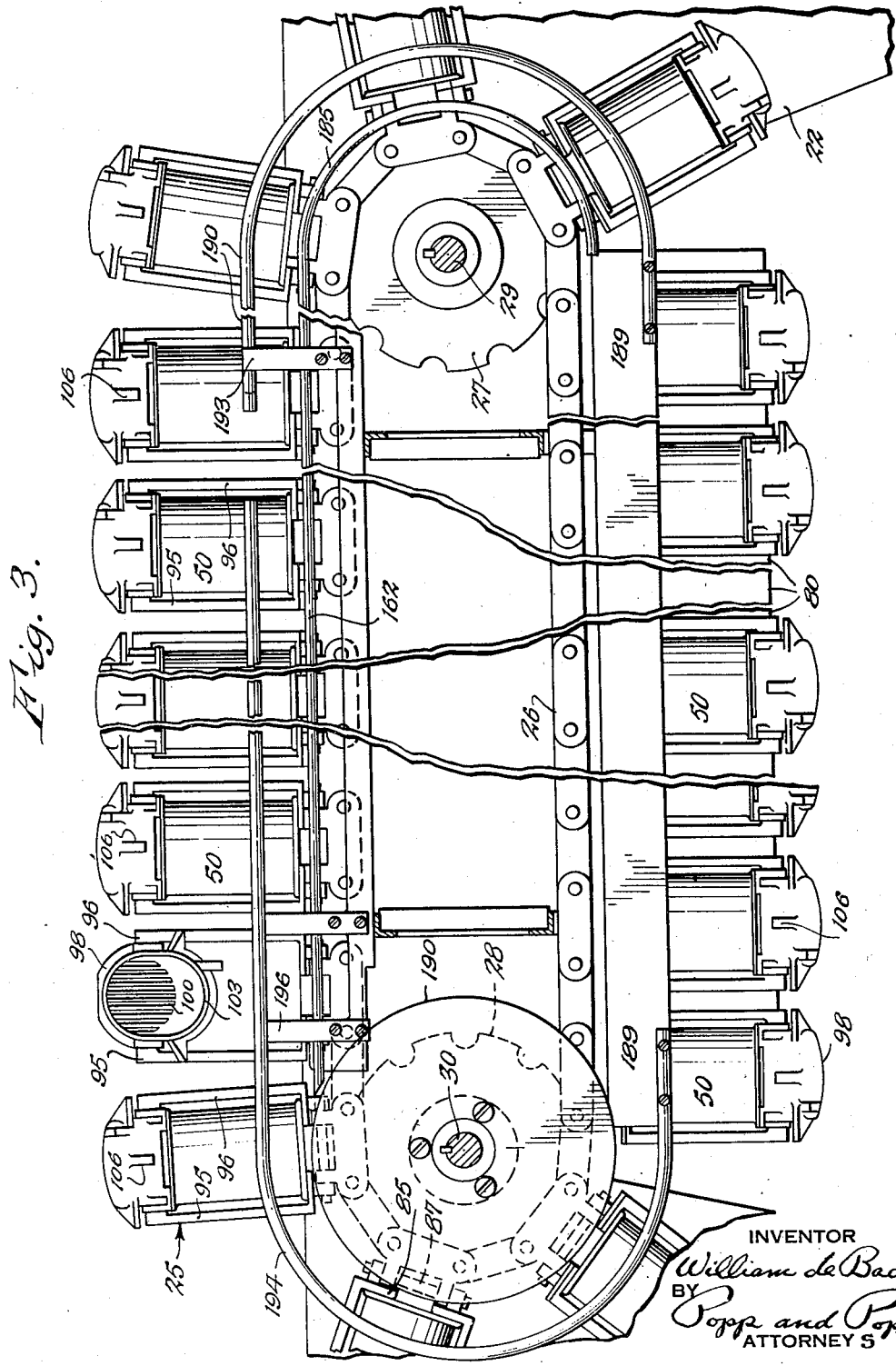

March 28, 1944. W. DE BACK 2,344,975
CAN CONVEYING AND TRANSFER APPARATUS
Original Filed July 15, 1940 3 Sheets-Sheet 3
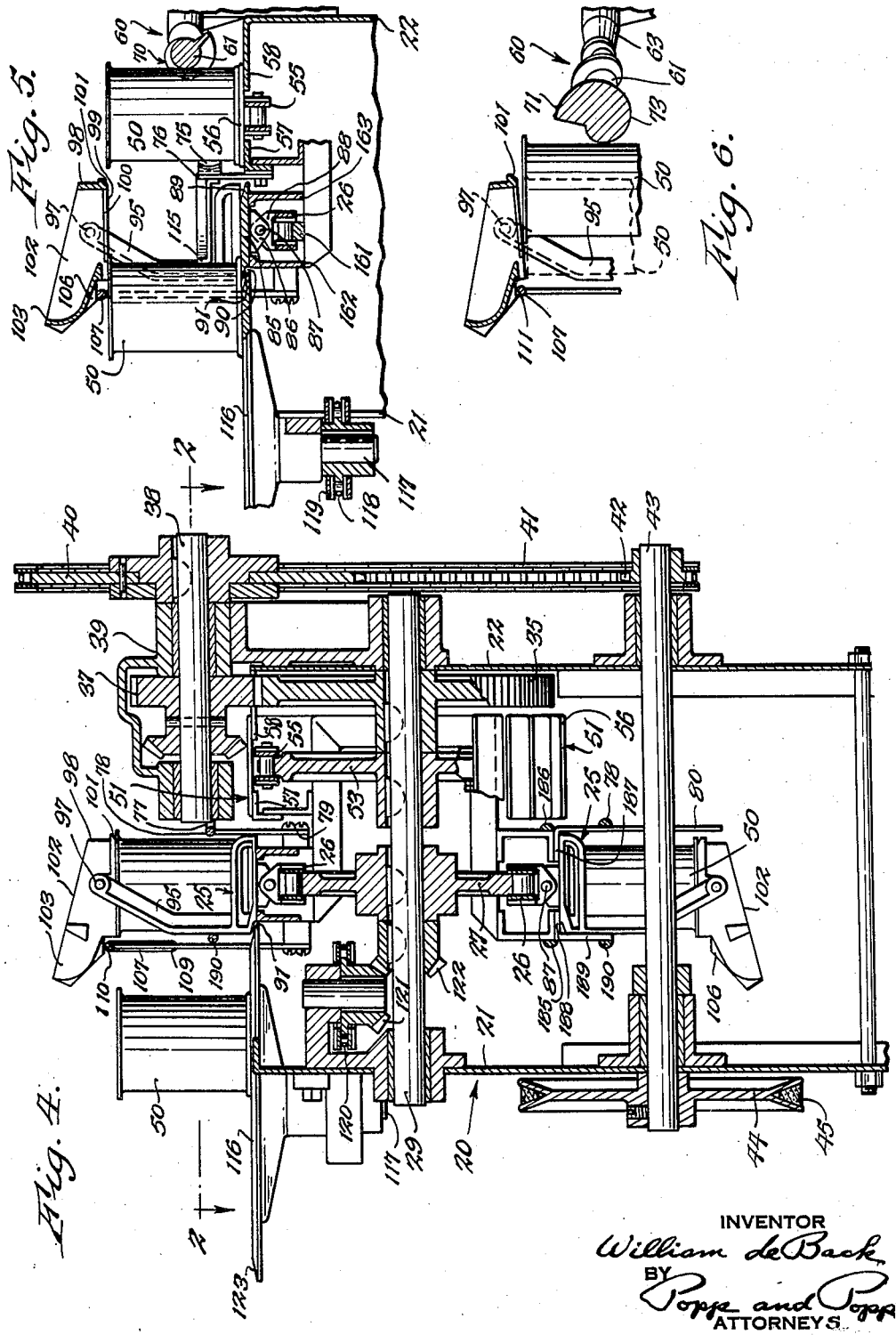
INVENTOR
William de Back
BY
Poppe and Poppe
ATTORNEYS Patented Mar. 28, 1944

2,344,975

UNITED STATES PATENT OFFICE 2,344,975

CAN CONVEYING AND TRANSFER APPARATUS

William De Back, Niagara Falls, N. Y., assignor to Chisholm-Ryder Company, Incorporated, Niagara Falls, N. Y., a corporation of New York Original application July 15, 1940, Serial No. 345,480, now Patent No. 2,310,940, dated February 16, 1943. Divided and this application June 29, 1942, Serial No. 448,982

3 Claims. (Cl. 198—22)

This invention relates to a can conveying and transfer apparatus and more particularly to such apparatus for feeding cans individually to the can carriers of an endless conveyer, such conveyer forming part, for example, of can draining and filling apparatus.

This application is a division of my copending application Serial No. 345,480, filed July 15, 1940, for Can draining and filling apparatus, now Patent No. 2,310,940, dated February 16, 1943.

The principal object of the invention is to provide a simple and efficient transfer device for moving cans, with or without foodstuffs packed therein, from a supply chain individually to the can carriers of a conveyer, the transfer device moving the cans into the carriers in proper timed relation.

Another object is to provide such a transfer apparatus which picks up the cans individually from a congestion of cans on the supply chain and positively propels each can into a corresponding can carrier thereby to insure all of the can carriers being filled with cans.

Another object is to provide such a transfer apparatus which comprises a single screw rotated in synchronism with the conveyer carrying the can carriers, the screw being formed to effect the transfer of the cans individually into the can carriers.

Another object is to provide such a can transfer apparatus which operates at high speed and without danger of injuring the cans being transferred or spilling any contents thereof.

In the accompanying drawings:

Fig. 1 is a top plan view of a can conveying and transfer apparatus embodying my invention, the apparatus being illustrated in conjunction with the can draining and filling apparatus forming the subject of my said application Serial No. 345,480 of which the present application is a division and to which reference is made for a more complete disclosure of the features not directly concerned with the subject matter of the present application.

Fig. 2 is an enlarged, fragmentary, horizontal section, taken on line 2—2, Fig. 4.

Fig. 3 is an enlarged, fragmentary, vertical section, taken on line 3—3, Fig. 1.

Fig. 4 is an enlarged, fragmentary, transverse section, taken on line 4—4, Fig. 1.

Fig. 5 is a fragmentary, vertical, enlarged, transverse section, taken on line 5—5, Fig. 2 and showing a can being discharged from the can conveyer and another can being admitted to replace the can so discharged.

Fig. 6 is a vertical, fragmentary, enlarged, transverse section, taken on line 6—6, Fig. 1 and showing a can being transferred from the supply chain to a can carrier on the main conveyer.

The apparatus embodying my invention is shown as carried by a frame, indicated generally at 20, which includes side plates 21, 22 and suitable cross members to provide a rigid frame. The cans to be processed are received in can carriers, indicated generally at 25, which can carriers are mounted on an endless conveyer chain 26. This chain is carried at one end by a drive sprocket 27 and at its opposite end by an idler sprocket 28, the sprocket 27 being mounted on a drive shaft 29 suitably journaled in the side plates 21 and 22 of the machine frame as shown in Fig. 4 and the idler sprocket 28 being mounted on an idler shaft 30 which is also journaled in the side plates 21 and 22 of the frame.

A drive gear 35, as best shown in Fig. 4, is fast to the drive shaft 29, this gear 35 being driven by a pinion 37 fast to an overhead countershaft 38. The shaft 38 is suitably journaled in a gear casing 39 mounted on the frame 20 and is driven by a sprocket 40 which is fast to the shaft 38. The sprocket 40 is connected by a drive chain 41 with a sprocket 42 fast to a main drive shaft 43, this drive shaft being suitably journaled on the side plates 21 and 22 of the main frame. A drive pulley 44 is fast to the opposite end of the main drive shaft 43, this drive pulley 44 being connected by a belt 45 with any suitable source of power such as the pulley 46 at the end of the shaft 47 of an electric motor 48 mounted on a bracket 49.

The cans 50 are placed upon a feeding conveyer, indicated generally at 51, the upper run of this feeding conveyer being arranged alongside of the line of can carriers 25 traversing the upper stretch of the chain 26 and moving at a slightly higher rate of speed to insure an adequate supply of cans for transference into the can carriers 25. For this purpose a drive sprocket 53 is fast to the shaft 29, as best shown in Fig. 4, and an idler sprocket (not shown) is arranged on the same side of and adjacent the opposite end of the frame 20, these sprockets being connected by a chain 55 and being arranged alongside and being of larger diameter than the sprockets 27 and 28 so that the chain 55 is driven at a slightly higher speed than the chain 26.

The links of the chain 55 carry a plurality of horizontal slats 56, these slats forming an extended upper surface for receiving the cans 50. In order to prevent sagging of the upper stretch of the chain 55, the opposite ends of the slats 56 are supported on horizontal rails 57 and 58, these rails being mounted on the main frame of the machine in any suitable manner.

The chain 55 is moved to feed the cans 50 toward the right, as viewed in Figs. 1 and 2, and into engagement with a timed feeding screw indicated generally at 60 which screw is synchronized with the operation of the conveyer chain 26 so as to shift one can 50 from the feeding conveyer 51 into each passing can carrier 25 on the conveyer chain 26. Any excess of cans 50 placed on the feeding conveyer 51 are held back by the screw 60 until fed in the proper timed relation to the can carriers 25.

For this purpose, the screw 60 comprises a shank or horizontal shaft 61 which is arranged over the feeding conveyer in the path of the cans 50 carried thereon, the screw being arranged at an angle to the line of movement of the cans on the feeding conveyer so as to gradually displace the cans on the feeding conveyer laterally toward the center of the machine and into the can carriers 25 carried by the conveyer chain 26. The shaft or shank 61 of the screw 60 is journaled at one end in a bearing 63 mounted on the main frame of the machine and at its opposite end in a bearing 64 in the gear case 39 which houses the gears carried by the overhead countershaft 38. As best shown in Figs. 2 and 4, the overhead countershaft 38 carries a beveled gear 65 which is preferably made integral with the driving pinion 37, this beveled gear 65 meshing with and driving a beveled pinion 66 fast to the end of the screw shaft 61. The thread 70 on the screw shaft 61 is of peculiar form to effect the timed transfer of the cans 50 into the can carriers 25. This thread 70 is generally in the form of a spiral, its convolutions generating adjacent the bearing 63, and increasing in pitch and lateral amplitude toward the bearing 64. This thread terminates at its maximum amplitude in an enlarged solid portion 71, the groove 72 between the convolutions of the thread 70 being continued into this solid portion but being formed therein to become rapidly shallower so as to form a cam groove 73 which effects a rapid lateral transfer of each can 50 which is caught in the groove 72 and carried down this groove into the cam groove 73. This cam groove 73 is formed to substantially merge into the cylindrical surface 74 of the enlarged solid portion 71 as best shown in Fig. 2.

The first of the line of cans assembled on the feeding conveyer 51 is urged into engagement with the lead end of the thread 70 of the screw 60 by a leaf spring 75 which is secured to the outer face of a bracket 76 which is in turn mounted on the main frame of the machine. This first can is picked up by the first convolution of the thread of the screw 60 which is rotating so as to move this can in the direction of movement of the two conveyers 51 and 26. The can so moving engages the shaft 61 of the screw 60 and since this shaft is set at an angle, the moving can is forced laterally against the resistance of the spring 75. When this can passes to the second convolution of the thread of the screw, the small initial convolution of the screw picks up the next succeeding can in the line assembled on the conveyer 51. The cans thereby travel along the groove 72 between the several convolutions of the thread 70 in procession, one between adjacent convolutions, and when the first reaches the continuation 73 of this groove in the enlargement 71, the rapid change of the form of this groove quickly forces the leading can laterally into the adjacent can carrier 25. It will be seen that the screw 60 can readily be designed and timed to deposit one can in each of the can carriers 25 as the series of can carriers pass by and that this transfer of the can is effected positively and without danger of jamming. The completion of the insertion of the cans in the can carriers 25 can be effected by the inclined end 77 of a guide rail 78, this end engaging each can as it is moved along by the conveyer chain 26 and completing its lateral movement into its carrier. This rail 78 is suitably supported on small posts 79 and extends around the driving sprocket 27, its lower end being secured to the outside of a plate 80 projecting downwardly from the frame along the corresponding side of the lower stretch of the chain 26.

Each of the can carriers 25 can be of any suitable construction and is shown as comprising a base plate 85 having a downwardly projecting central lug 86 which carries a pivot pin 87, this pin extending horizontally when the can carrier is on the upper and lower stretches of the chain 26, and in the direction of movement of the carrier. This pivot pin extends through ears 88 projecting laterally outwardly from alternate links of the chain 26 so that the base is free to swing from side to side. On its can receiving side the base plate 85 of each can carrier is beveled as indicated at 89 on its upper side so that transfer of a can from the feeding chain 51 to each base plate 85 by the screw 60 is effected smoothly and without interruption. The opposite edge of the base plate 85 is indented, as indicated at 90, and the extensions formed by this indentation are beveled on their undersides, as indicated at 91, so as to facilitate the discharge of the cans from the carrier as hereinafter described.

Each of the base plates is shown provided along its advancing and trailing sides with front and rear walls 92, 93, these walls thereby extending transverse to the direction of movement of the carriers and forming an open sided pocket or cradle for receiving the cans. These walls 92 and 93 can be of any suitable form but, as best shown in Fig. 2, are preferably tapered toward a thicker center so as to insure the free entry and proper positioning of the cans in the can carriers, and the free discharge of the cans therefrom.

On the discharge side of each of the base plates 85 of the can carriers, two posts 95, 96 rise from the side walls 92, 93, these posts being preferably formed integral with these walls and the base plate and being bent laterally at their upper ends so as to terminate approximately over the center of the can carrier. At their upper ends these posts 95, 96 carry the pivot pins 97 of a swinging top member 98. This swinging top member is generally of round cup-shaped form having a bottom 99 which is smooth on its underside to engage the upper rim of the open cans 50 and this bottom also being slotted, as indicated at 100, so as to form a screen for the open end of a can 50 so engaged. On the can receiving side of the can carrier the bottom 99 is provided with an undercut bevel 101 to facilitate the movement of the cans to a position thereunder. The side walls 102 of this swinging top member 98 rise from the edges of the bottom 99 and at the discharge side of the can carrier, this side wall is formed to provide a laterally extending lip 103 this lip overbalancing the swinging top member so that it normally falls to the generally upright position illustrated at the upper left of Fig. 3, second carrier from the left. Each lip 103 is also provided on its underside with a lug 106, this lug functioning to control the swinging movement of the swinging top member through its engagement with a controlling guide rail indicated generally at 107.

This rail 107 is suitably supported along the upper stretch of the conveyer chain 26 at the can feeding and discharging stations. This rail starts at a comparatively low elevation, as indicated at 109, and rises to its maximum height and proceeds generally horizontally, as indicated at 110 along the discharging station and the can feeding station. By the form of the rail 107, the position of the swinging top 98 is controlled to permit the automatic feeding and discharge of the cans 50 onto and from the main conveyer. At the feeding station the lug 106 of the swinging top 98 of the can carrier riding along the top of the rail 107 drops into a depression 111 of this rail. This position of the parts is illustrated in Fig. 6. Since the lip 103 overbalances the top 98 in its movement around the pivots 97, the beveled intake side 101 of this swinging top rises and its discharge side drops on encountering the depression, so that the top is held in the slightly angular position shown in Fig. 6, this position insuring the ready insertion of a can 50 onto the base plate 85 of the can carrier and under the swinging top 98 by the timed feed screw 60. As the screw is moving the can toward the center of the can carrier, the lug 106 rides up an incline of the rail 107 so that the bottom 99 of the swinging top 98 is brought into parallelism with the rim of the can. It will be understood that the relation of this rise to the feeding of the can into the can carrier by the screw 60 is not critical inasmuch as the insertion of the can itself would bring the top 98 into approximate parallelism with the rim of the can. When the can is centered relative to the carrier and the swinging top 98, as illustrated in Fig. 4, there is no further necessity for the rail 107 since the swinging top 98 is held against swinging by the can itself. On passing beyond this rail, therefore, the can is held between the base plate 85 and the swinging top until the lug 106 reengages the part of the rail 107 which rises to the elevation 110 at the discharging station. When this is engaged, the swinging top 98 is brought into substantially exact parallelism with the rim of the can so that the can can be readily slid out from under the top without having the top cock or swing so as to interfere with the free discharge of the can.

The cans so loaded onto the carriers on the upper run of the conveyer are conveyed around the right hand end of the chain conveyer, as viewed in Fig. 3, and are thence conveyed along the lower run of the chain conveyer in an inverted position, from which the cans are conveyed around the left hand end of the chain conveyer, as viewed in Fig. 3, to the upper run of the chain conveyer where they are brought in an upright position to the discharge station.

This discharge of the cans from the carriers 25 as they pass the discharge station is shown as comprising a cam extension 115 on the fixed bracket 76, which extension projects into the path of the cans, as best shown in Figs. 2 and 5, from the right hand or feeding side, as shown in Fig. 5. When the cans encounter this fixed discharge cam 115, they are forced out of the carriers 25 and since at this time the swinging tops 98 of the can carriers are supported on the high straight part 110 of the rail 107, this discharge of the cans is not interfered with by any irregular or cocking movement of the swinging tops 98. The cans are discharged by this stationary cam onto the upper horizontal face of a can discharge wheel 116 which is suitably journaled on the main frame of the machine to rotate about a vertical axis. The depending shaft 117 of this can discharge wheel, as best shown in Fig. 5, carries a sprocket 118 which is driven by a chain 119. This chain, as best shown in Fig. 4, is driven by a sprocket 120 which is formed integrally with a beveled pinion 121 meshing with a pinion 122 fast to the horizontal shaft 29 from which the conveyer chains 26 and 51 are driven. The can discharge wheel 116 is therefore rotated in the direction of the arrow shown in Fig. 1 and is driven in synchronism with the movement of the can carriers. To facilitate the transfer from the can carriers onto the discharge wheel 116, the periphery of the can wheel is beveled on its upper side, as indicated at 123, so as to fit under the bevels 91 at the discharge side of the base plates 85 of the can carriers. By so beveling the can discharge wheel 116 and the discharge sides of the base plates 85, it will be seen that the transfer of the cans to the can wheel by the stationary cam 115 is effected smoothly in the manner illustrated in Fig. 5.

In my said copending application Serial No. 345,480, of which the present application is a division, the purpose of providing the pivotal mounting 87 for each can carrier 25 was for the purpose of tipping each can carrier and can while being filled with a liquid as from an overhead reservoir 154. As this feature does not form a part of the present invention, the upper stretch of the conveyer chain can be regarded as supported to traverse a straight path between the sprockets 28 and 27 by a rail 161 engaging the rollers of this chain and the bottom plates 85 of the can carriers can be regarded as held in a horizontal position by side rails 162, 163 along which these bottom plates ride, as best shown in Figs. 4 and 5. During the passage of the can carriers 25 around the sprockets 27 and 28 and the lower stretch of the conveyer chain 26, they are also prevented from tipping about the pivot pins 87 as an axis. For this purpose, a pair of stationary semi-circular rails 185, 186 are arranged concentric with the driving sprocket 27, these rails engaging the opposite sides of the bottom plates 85 of the can carriers as they travel around the sprocket 27 so as to hold these plates parallel with the axis of the sprocket. The upper ends of the semi-circular rails 185, 186 are secured at their upper ends, respectively, to the ends of the upper stationary rails 162, 163 and at their lower ends to the frame of the machine.

Along the lower stretch of the conveyer 26, the can carriers are held against tipping by the engagement of the bottom plates 85 at one side with a flange 187 of the depending side plate 80 and at the other side by a flange 188 projecting inwardly from a stationary depending side plate 189 arranged on the side of the path of the can carriers opposite from the plate 80.

To hold the can carriers against tipping while passing around the driven sprocket wheel 28 and before being delivered onto the upper stationary side rails 162, 163, a pair of disks 190 are suitably secured to the opposite ends of the hub of the driven sprocket wheel 28, as best shown in Fig. 3, these plates or disks extending to engage the bottom plates 85 of the can carriers on opposite sides of the pivots 87 and hence hold them against tipping while passing around the driven sprocket.

Throughout their course in the can carriers 25, the cans 50 are prevented from slipping sidewise out from between the bottom plates 85 of the can carriers and the swinging tops 98. For this purpose the side rail 78, the front end 77 of which positions the cans within the carriers, extends concentrically around the driving sprocket 27 alongside the path of the can holders and on the other side of the can holders a similar rail 190 is provided which is secured at its upper end to posts 193 and at its lower end to the plate 189. The depending side plates 80 and 189 serve to retain the cans in the carriers along the lower stretch of the conveyer chain 26. Around the driven sprocket 28, the cans are prevented from moving sidewise out of the holders by a pair of curved rails 194, these being secured at their lower ends, respectively, to the plates 189 and 80 and at their upper ends to posts 196. The cans are prevented from falling from the can carriers while traversing the initial part of the upper stretch of the conveyer chain 26 by horizontal extensions of the upper ends of the curved rails 194.

In the operation of the apparatus the open cans, empty or filled with the vegetables to be packed, are placed upon the upper stretch of the can feeding conveyer 51. These cans are conveyed toward the screw 60 against which they pile up, the cans being pressed against the side of the screw by the spring 75. The rotation of the screw 60 picks up one can at a time between its convolutions and since the screw is inclined the cans are moved laterally into the can conveyery 25 on the conveyer chain 26. The screw 60 is rotated in timed relation to the movement of the chain 26 so that the transfer of each can into the can carriers by the enlarged portion 74 of the screw 60 which contains the cam groove 73 is effected with the can in proper registry with the corresponding can carrier. The final positioning of the can is effected by the cam extension 77 of the rail 78.

The endless conveyer chain 26 is moving in the same direction as the feeding conveyer 51 and when each can carrier 25 reaches the point of can transfer by the screw 60 the swinging top 98 of the empty can carrier is permitted to tip slightly to the position shown in Fig. 6. This tipping is permitted by the dip 111 in the guide rail 107 which supports the swinging top members 98 in a generally horizontal position during the feeding into and discharge of cans from the can carrier. The swinging top 98 tips to the position shown in Fig. 6 on encountering the dip 111 by reason of the swinging top member 98 being heavier on that side which is formed to provide the lip 103.

The tipping of the swinging top member 98 to the position shown in Fig. 6 is for the purpose of facilitating the insertion of the can between the base plate 85 of each can carrier and the swinging top 98. During this transfer of each can into the can carrier 25 by the screw 60 the can carrier is held upright and its base plate 85 in a horizontal position by the two stationary side rails 162 and 163 which support the bottom surface of the base plates 85 on opposite sides of the pivot pin 87. As the can carriers with the contained cans travel around the driving sprocket 27, this position of the can carriers 25 is maintained by the semicircular side rails 185 and 186 which engage the undersides of the base plates 85 on opposite sides of the pivot pins 87 as the carriers travel around the periphery of this driving sprocket 27. The cans are also prevented from sliding out sidewise from between the base plates 85 and swinging top members 98 of the can carriers when passing around the driving sprocket by the side rails 78 and 192.

On traversing the lower stretch of the chain 26, the can carriers are prevented from swinging about their pivots 87 by the engagement of the base plates 85 of the can carriers with the inwardly projecting flanges 187 and 188 of the depending side plates 80 and 189. These plates also prevent the cans from sliding out sidewise from between the base plates 85 and the swinging top members 98 of the can carriers. During the continued movement of the can carriers around the driven sprocket wheel 28, the can carriers are prevented from swinging about their pivots 87 by the engagement of their base plates 85 with the side disks 190 on the shaft of this sprocket wheel and the cans are prevented from sliding sidewise out of the can carriers by the curved side rails 194. On entering the upper stretch of the conveyer chain 26, the rollers of this chain are engaged by the horizontal bar 161 and the opposite sides of the base plates 85 of the can holders are engaged by the side rails 165, 166 so as to prevent the cans from tipping while traversing the upper stretch of these belts. The regulated tipping of these bottom plates 85, while passing the upper stretch of the chain 26 and under nipples (not shown) supplied with liquid from the reservoir 154 is a part of the subject matter of my said parent patent application Serial No. 345,480.

The continued movement of the can carriers along these side rails 162 and 163 brings the cans into engagement with the cam face 115 of the bracket 76, this face pushing the cans out of the can holders onto the can discharge wheel 116. When this can discharging is effected the lug 106 is engaged by the elevated part 110 of the side rail 107 so that the swinging top 98 of the can carrier 25 from which a can is being ejected is held in a substantially horizontal position and prevented from cocking or interfering with the free discharge of the can by the cam 115 onto the discharge wheel 116. After being emptied the lug 106 of the can carrier drops into the depression 111 of the rail 107 so as to tip the swinging top 98 of the can carrier to the position shown in Fig. 6, thereby to facilitate the feeding of another can into the carrier. This is the position of the parts assumed at the beginning of the description of the operation.

From the foregoing it will be seen that the present invention provides a very simple and efficient transfer device for positively transferring cans one at a time from a congestion of the cans on a feeding belt to individual can carriers on a conveyer and that the transfer is effected without danger of mutilating the cans or spilling any contents thereof.

I claim as my invention:

1. In a machine of the character described, a conveyer, a series of can carriers mounted on said conveyer and means for feeding cans sideways into said can carriers in timed relation to the movement of said conveyer comprising an angularly disposed screw having an enlarging spiral thread leading to an enlarged discharging portion, said enlarged portion being provided with a spiral groove of rapidly diminishing depth and forming a continuation of the groove of said spiral thread, means for rotating said screw in timed relation to said conveyer whereby the cans received in said groove of rapidly diminishing depth are transferred individually into said can carriers, and means for feeding the cans to the leading end of said screw.

2. In a machine of the character described, a horizontal conveyer, a series of can carriers mounted in spaced relation on said conveyer, a horizontal feeding conveyer arranged alongside said first conveyer, means for moving said conveyers in the same direction and means for transferring cans sidewise from said feeding conveyer to said can carriers in timed relation therewith, comprising a horizontal screw which is angularly disposed across the path of the cans on said feeding conveyer, said screw having an enlarging spiral thread leading to an enlarged discharging portion at one end disposed adjacent the path of said can carriers, said enlarged portion being provided with a spiral groove of rapidly diminishing depth and forming a continuation of the groove of said spiral thread, and means for rotating said screw in timed relation to said first conveyer whereby the cans received in said groove of rapidly diminishing depth are transferred individually into said can carriers.

3. In a machine of the character described, a conveyer, a series of can carriers mounted on said conveyer and means for feeding cans sideways into said can carriers in timed relation to the movement of said conveyer comprising an angularly disposed screw having an enlarging spiral thread leading to an enlarged discharging portion, said enlarged portion being provided with a spiral groove of rapidly diminishing depth and forming a continuation of the groove of said spiral thread, means for rotating said screw in timed relation to said conveyer whereby the cans received in said groove of rapidly diminishing depth are transferred individually into said can carriers, means for feeding the cans to the leading end of said screw and a stationary cam arranged alongside of said conveyer adjacent the said enlarged discharging portion of said screw and engaging said cans to complete the insertion of said cans into said can carriers.

WILLIAM DE BACK.